United States Patent
Reavely et al.

(10) Patent No.: US 10,453,117 B1
(45) Date of Patent: Oct. 22, 2019

(54) DETERMINING DOMAINS FOR NATURAL LANGUAGE UNDERSTANDING

(71) Applicant: Amazon Technologies, Inc., Seattle, WA (US)

(72) Inventors: Simon Peter Reavely, Lexington, MA (US); Rohit Prasad, Acton, MA (US); Imre Attila Kiss, Arlington, MA (US); Manoj Sindhwani, Oak Hill, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/197,022

(22) Filed: Jun. 29, 2016

(51) Int. Cl.
| | |
|---|---|
| *G06Q 10/02* | (2012.01) |
| *G06F 17/27* | (2006.01) |
| *G06Q 30/06* | (2012.01) |
| *G10L 15/22* | (2006.01) |
| *G06N 5/02* | (2006.01) |
| *G06F 16/33* | (2019.01) |

(52) U.S. Cl.
CPC ....... *G06Q 30/0645* (2013.01); *G06F 16/334* (2019.01); *G06F 17/278* (2013.01); *G06F 17/2785* (2013.01); *G06N 5/022* (2013.01); *G06Q 10/02* (2013.01); *G10L 15/22* (2013.01); *G10L 2015/223* (2013.01)

(58) Field of Classification Search
CPC ............................ G06Q 10/02; G06F 17/2785
See application file for complete search history.

(56) References Cited

U.S. PATENT DOCUMENTS

| | | | | |
|---|---|---|---|---|
| 7,013,275 | B2* | 3/2006 | Arnold | G10L 15/30 |
| | | | | 704/244 |
| 7,831,427 | B2* | 11/2010 | Potter | G10L 15/26 |
| | | | | 704/235 |
| 8,140,328 | B2* | 3/2012 | Williams | G10L 15/22 |
| | | | | 704/236 |
| 9,117,453 | B2* | 8/2015 | Bielby | G10L 15/32 |
| 9,767,091 | B2* | 9/2017 | Sarikaya | G06F 17/276 |
| 2008/0015864 | A1* | 1/2008 | Ross | G10L 15/1822 |
| | | | | 704/275 |
| 2009/0210262 | A1* | 8/2009 | Rines | G06Q 10/02 |
| | | | | 705/5 |
| 2014/0006030 | A1* | 1/2014 | Fleizach | G06F 17/30014 |
| | | | | 704/260 |
| 2014/0095147 | A1* | 4/2014 | Hebert | G06F 17/2785 |
| | | | | 704/9 |

(Continued)

*Primary Examiner* — Paras D Shah
*Assistant Examiner* — Bryan S Blankenagel
(74) *Attorney, Agent, or Firm* — Pierce Atwood LLP

(57) ABSTRACT

A system capable of performing natural language understanding (NLU) using different application domains in parallel. A model takes incoming query text and determines a list of potential supplemental intent categories corresponding to the text. Supplemental applications within those categories are then identified as likely candidates for responding to the query. Application specific domains, including NLU components for the particular supplemental applications, are then activated and process the query text in parallel. Further, certain system default domains may also process incoming queries substantially in parallel with the supplemental applications. The different results are scored and ranked to determine highest scoring NLU results.

21 Claims, 8 Drawing Sheets

(56) References Cited

U.S. PATENT DOCUMENTS

| | | | | |
|---|---|---|---|---|
| 2014/0163959 A1* | 6/2014 | Hebert | G06F 17/2785 | 704/9 |
| 2014/0297613 A1* | 10/2014 | Kasterstein | G06F 17/30867 | 707/706 |
| 2014/0379334 A1* | 12/2014 | Fry | G10L 15/22 | 704/235 |
| 2015/0057837 A1* | 2/2015 | Moore, Jr. | G06Q 10/02 | 701/2 |
| 2015/0066479 A1* | 3/2015 | Pasupalak | G06F 17/27 | 704/9 |
| 2015/0081294 A1* | 3/2015 | Hsu | G10L 15/26 | 704/235 |
| 2015/0286960 A1* | 10/2015 | Habibi | G06Q 10/02 | 705/5 |
| 2015/0317302 A1* | 11/2015 | Liu | G06F 17/28 | 704/9 |
| 2016/0117360 A1* | 4/2016 | Kunc | G06F 17/30401 | 707/730 |
| 2016/0154783 A1* | 6/2016 | Hebert | G06F 17/2705 | 707/755 |
| 2016/0154792 A1* | 6/2016 | Sarikaya | G06F 17/2785 | 704/9 |
| 2016/0259623 A1* | 9/2016 | Sumner | G06F 16/3344 | |
| 2017/0060848 A1* | 3/2017 | Liu | G06F 17/28 | |

\* cited by examiner

DETERMINING DOMAINS FOR NATURAL LANGUAGE UNDERSTANDING

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
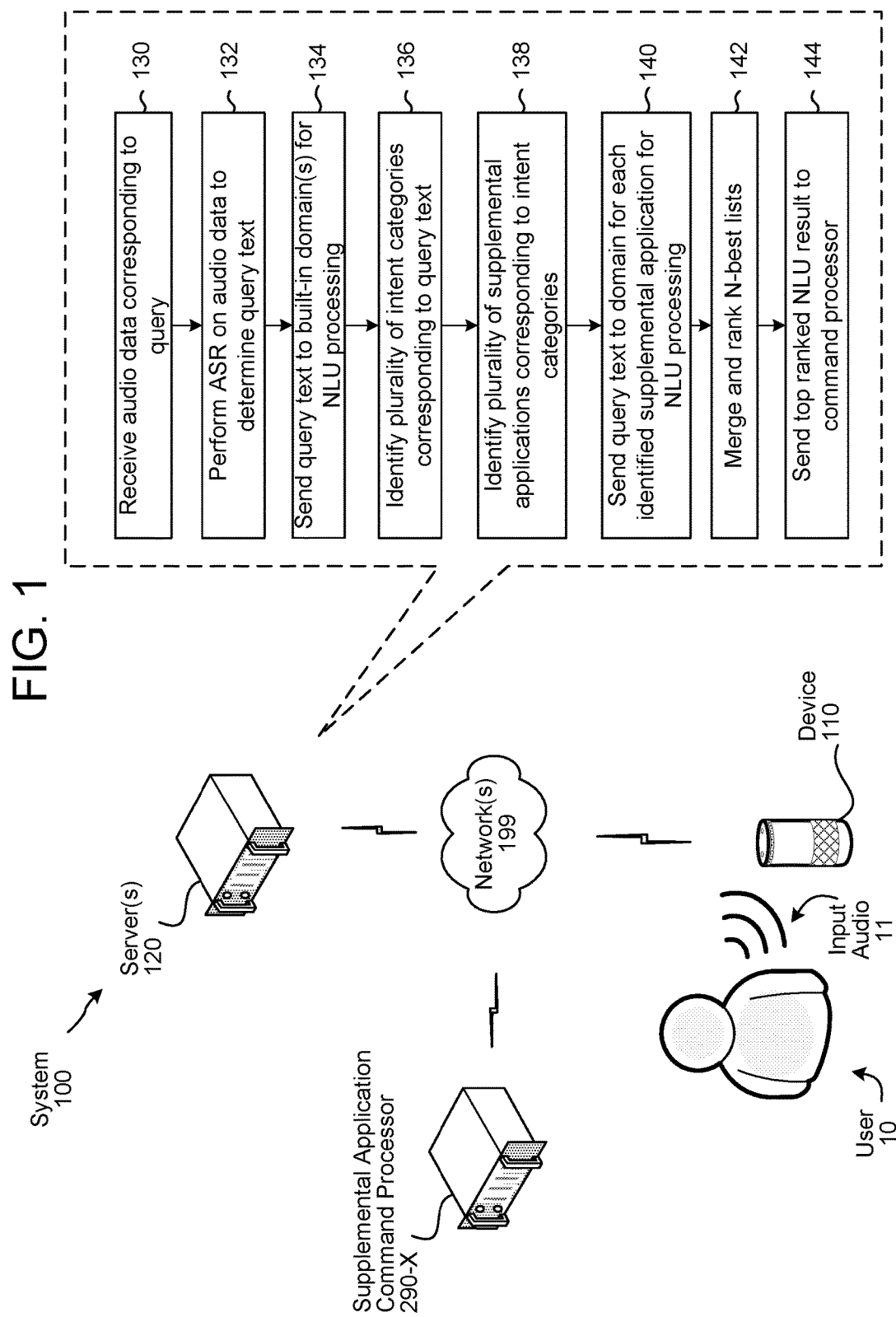
FIG. 1 illustrates a system for configuring and operating a system to parse incoming queries according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used when performing speech processing. A typical such distributed environment may involve a local device having one or more microphones being configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

A user utterance may include a query. For example, the query may include an input to the system to provide information in response to the query or to execute a command (such as playing music, purchasing an item, etc.). There are many types of queries that a user may pose from simple single-fact questions (for example, "what is the capital of France?") to more detailed questions involving time, place, multiple entities, etc. (for example, "when was Tom Cruise married to Nicole Kidman?"). Further, the query may include a command that may range in specificity/complexity, for example one command may be "set a timer for 5 minutes" where another may be "play the latest album by the foo fighters." Different queries may thus involve different intents, that is different utterances may be asking the system to perform different operations. In the examples above the utterances have the intents of providing a capital of a country, providing a date when two individuals were married, setting a timer, and playing music. Different utterances may also involve different entities. An entity is a person, place, thing, etc. that has an identity. In order to perform the action desired by the utterance the system must be able to identify the entity in the utterance. In the examples above the entities involved are France, Tom Cruise, Nicole Kidman, Foo Fighters, and their latest album.

As can be appreciated, natural language understanding involves a complex analysis of text (which may be obtained either from a spoken utterance or from some other source) and potentially other data to determine the text's precise meaning. The process of identifying the intent of an utterance (i.e., the ultimate desired result of the query) may be referred to as intent classification. The process of identifying an entity in an utterance is a two stage processes where the first stage, entity recognition, involves identifying a mention of an entity in query text needed to complete the intent (sometimes called slots) and the second stage, called entity recognition, actually matches the text of the entity to a specific entity known to the system.

Present NLU query answering systems typically employ a multi-domain architecture where each domain represent a certain subject area for a system. Example domains include weather, music, shopping, etc. Each domain is typically configured with its own intents, slot structure, or the like as well as its own logic or other components needed to complete the NLU processing for a particular query. Thus, in order to configure a system to handle a new function, intents, slots and other items used for speech processing need to be specially designed, configured, and tested for each new function. This leads to significant resource expenditures to train and enable the system to handle additional domains.

Further, during runtime, a speech processing system may process a single utterance using multiple domains at the same time, or otherwise substantially in parallel. As the system may not know ahead of time what domain the utterance belongs in until the speech processing is complete, the system may process text of an utterance substantially simultaneously using models and components for different domains (e.g., books, video, music, etc.). The results of that parallel processing may be ranked, with the highest ranking results being executed/returned to the user.

While a system may have a certain number of built-in domains (music, shopping, providing information), it may be desirable to open a system up to third party developers to create supplemental applications that are customized by the developer and enable users to execute commands in new domains using the speech processing system. The categories of such third party applications may cover many different intent categories (such as a car service, food delivery, airplane reservations, etc.). Each supplemental application may be able to process queries in a supplemental domain, which is a set of models, logic, components, etc. configured to handle an incoming query for the particular supplemental intent of the supplemental application. To configure a supplemental application, the system may receive (such as from a developer of the supplemental application) information needed to process queries related to the application, the categories of intents capable of being handled by the particular supplemental application, or other information. A supplemental application may be an application where data needs to be sent externally to system 100 for ultimate handing of an intent from an input query whereas a built-in application may be an application that the system can execute on its own.

As can be appreciated, to enable the system to expand its capabilities using such supplemental applications, the system must be configured to accurately determine which application should handle an incoming user query. Currently, systems do this by employing rules which trigger based on the phrasing of the query. If the query triggers a rule for a particular supplemental application, that supplemental application is selected and the system cuts off the parallel processing for other supplemental application domains or built-in domains. There are certain drawbacks to this approach. First, rules tend to be restrictive in how the user may phrase a query. A query in the form of "get me an Uber to Boston" may launch an Uber application but "get me a car to Boston" may not. Second, the rule approach may require each application developer to provide specific examples of the specific phrasing of queries that they may handle, which in turn may require the system to generate new rules for each application. Third, a rule may be less restrictive, but may overlap with another application. For example "get me a car to Boston" may be equally applicable to an Uber application, a taxi application, or a car-rental application. Thus making too early a decision on which application should handle a particular query (that is, making the decision without the benefit of further downstream NLU processing that may help the system select the appropriate application) may be undesirable.

To improve system performance and enable a speech processing system to more easily incorporate new supplemental applications and their accompanying intents, domains and functionality, offered is a natural language processing system that performs early sorting of an incoming query into one or more potential supplemental intent categories (where each supplemental intent may be handled by one or more supplemental applications). The top scoring supplemental intent categories may then be sorted and ranked, resulting in a top set of potential supplemental applications being activated and enabled to process the incoming query in parallel. Further, the supplemental application pipeline may process the query in parallel to a pipeline dedicated to built-in system domains. The system may perform NLU processing using all these domains in parallel and may select a top scoring result at the completion of the NLU processing. The top scoring result may then be executed to resolve the query and perform the action desired by the user.

FIG. 1 shows a system 100 configured to perform NLU processing. Although FIG. 1, and other figures/discussion, illustrate the operation of the system in a particular order, the steps described may be performed in a different order (as well as certain steps removed or added) without departing from the intent of the disclosure. As shown in FIG. 1, a system 100 may include one or more devices 110 local to user(s) 10, as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

As shown in FIG. 1, a system may receive (130) audio data corresponding to a query. The system may then perform (132) ASR on the audio data to determine query text. The system may then send (134) the query text to NLU domains corresponding to built-in functionality of the system 100. Those domains may then perform NLU processing to obtain N-best lists (one for each built-in domain). The system may also identify (136) a plurality of intent categories corresponding to the query text along with scores for how the query text matches each intent category. The system may then identify (138) a plurality of applications corresponding to the intent categories. The applications may correspond to supplemental applications created by third-party developers and added to the system 100 to enhance the system functionality. The system may then send (140) the query text to the NLU domains for each of the identified supplemental applications. Each of domain for a supplemental application may then perform NLU processing to obtain N-best lists (one for each identified supplemental domain). The system may then merge and rank (142) the N-best lists resulting from the NLU processing of the built-in domains and domains for the supplemental applications. The system may then send (144) the top ranked result to a command processor 290, which, for a result associated with a supplemental application, may be a supplemental application command processor 290-X, which may be located separately from system 100.

Figure 2:
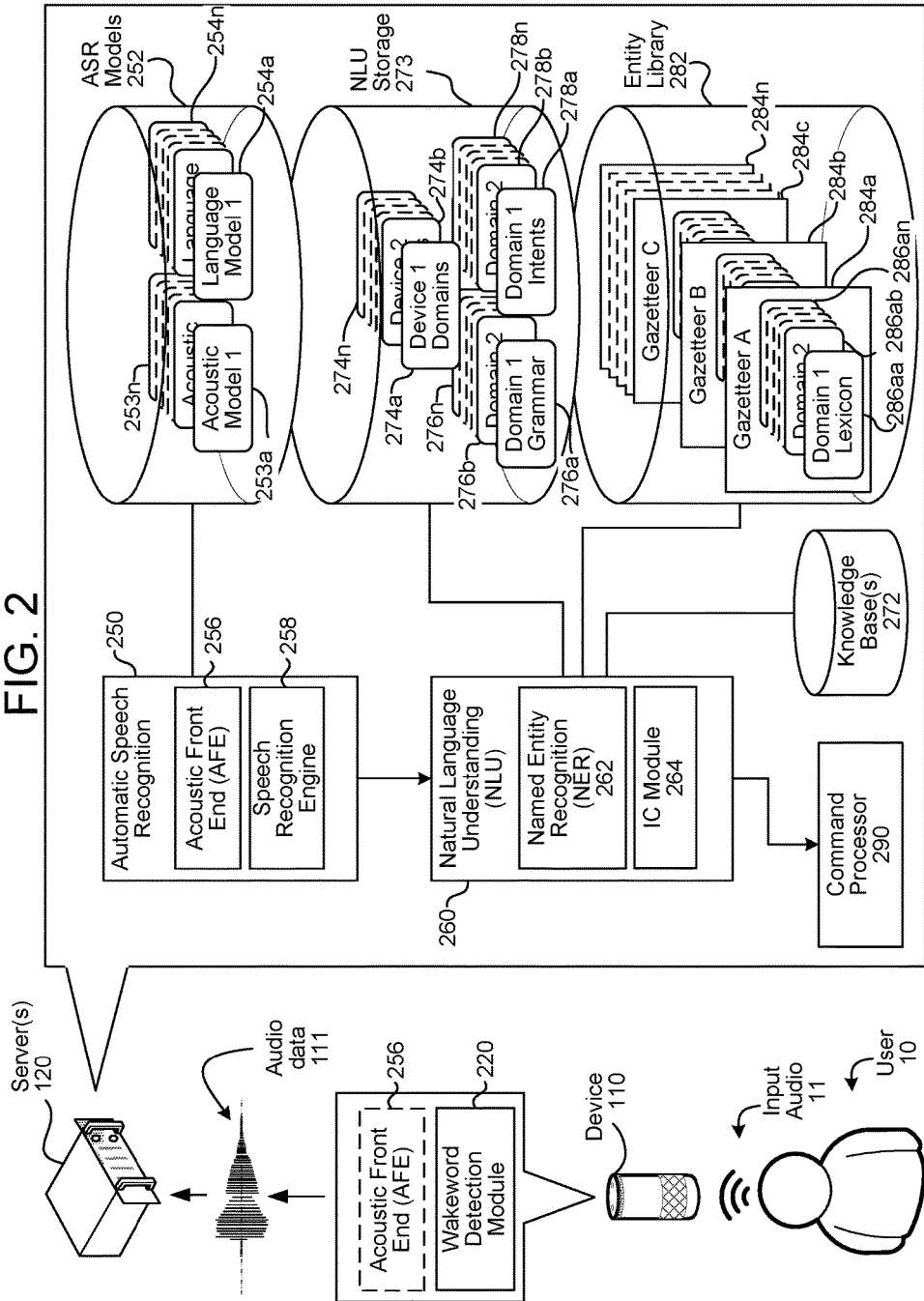
FIG. 2 is a conceptual diagram of components of a speech processing system according to embodiments of the present disclosure.

Further details of the domain-agnostic NLU processing are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/ qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. As shown in FIG. 2, an NLU component may include a named entity recognition (NER) module 262 which is used to identify portions of query text that correspond to a named entity that may be recognizable by the system. A downstream process called named entity resolution actually links a text portion to an actual specific entity known to the system. To perform named entity resolution, the system may utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 250 based on the utterance input audio 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom" (which may involve a downstream command processor 290 linked with a telephone application).

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 272.

To correctly perform NLU processing of speech input, an NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 262 receives a query in the form of ASR results and attempts to identify relevant grammars and lexical information that may be used to construe meaning. To do so, the NER module 262 may begin by identifying potential domains that may relate to the received query. The NLU storage 273 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result. This is described further in detail below in reference to FIG. 3.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278. Traditionally, the determination of an intent by the IC module is performed using a set of rules or templates that are processed against the incoming text to identify a matching intent.

In order to generate a particular interpreted response, the NER 262 applies the grammar models and lexical information associated with the respective domain to actually recognize a mention one or more entities in the text of the query. In this manner the NER 262 identifies "slots" (i.e., particular words in query text) that may be needed for later command processing. Depending on the complexity of the NER 262, it may also label each slot with a type of varying levels of specificity (such as noun, place, city, artist name, song name, or the like). Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. Each slot/field corresponds to a portion of the query text that the system believes corresponds to an entity. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 262 may parse the query to identify words as subject, object, verb, preposition, etc., based on grammar rules and/or models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the knowledge base 272). So for instance, if the query was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

Figure 3:
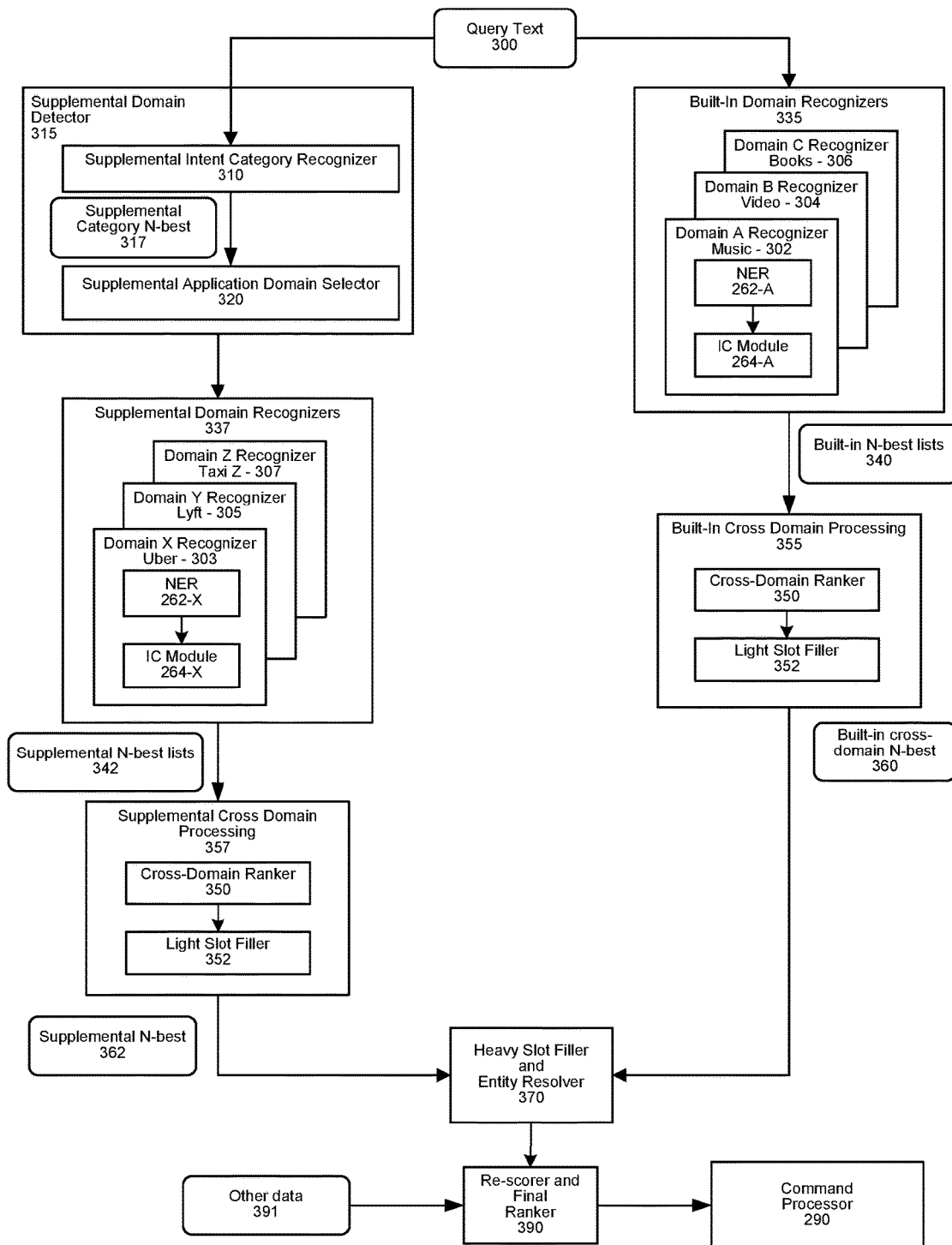
FIG. 3 is a conceptual diagram of a multi-domain architecture approach to natural language understanding according to embodiments of the present disclosure.

The NLU operations of existing systems may take the form of a multi-domain architecture, such as that illustrated in FIG. 3. As shown in FIG. 3, each component (save for the input query text 300, the other data 391 and the command processor 290) may be part of the NLU component 260). In the multi-domain architecture, each domain (which may include a set of intents and entity slots that define a larger concept such as music, books etc. as well as components such as trained models, etc. used to perform various NLU operations such as NER, IC, or the like) is constructed separately and made available to an NLU component 260 during runtime operations where NLU operations are performed on text (such as text output from an ASR component 250). Each domain may have specially configured components to perform various steps of the NLU operations.

For example, in a typical NLU system, the system may include the a multi-domain architecture consisting of multiple domains for the built-in intents executable by the system, such as music, video, books, and information. An example architecture for processing the built-in domains is illustrated along the right-hand side of FIG. 3 and may include the built-in domain recognizers 335, the built-in cross domain processing 355, the heavy slot filler and entity resolver 370 and the re-scorer and final ranker 390.

For example, a music domain recognizer 302 (Domain A) may have an NER component 262-A that identifies what slots (i.e., portions of input text) may correspond to particular words relevant to that domain. The words may correspond to entities such as (for the music domain) a performer, album name, song name, etc. An NER component 262 may use a machine learning model, such as a domain specific conditional random field (CRF) to both identify the portions corresponding to an entity as well as identify what type of entity corresponds to the text portion. For example, for the text "play songs by the stones," an NER 262-A trained for a music domain may recognize the portion of text [the stones] corresponds to an entity and an artist name. The music domain recognizer 302 may also have its own intent classification (IC) component 264-A that determines the intent of the text assuming that the text is within the proscribed domain. An IC component may use a model, such as a domain specific maximum entropy classifier to identify the intent of the text, where the intent is the action the user desires the system to perform.

As illustrated in FIG. 3, multiple domains may operate substantially in parallel, with different domain specific components. That is, domain B for video may have its own recognizer 304 including NER component 262-B, and IC module 264-B. Domain C for books may also have similar components in its recognizer 306, and so on for the different built-in domains available to the system, where the built-in domains are integrated into the system rather than being added on, such as in the case of supplemental domains. When input query text is received, the same query text that is input into the NLU pipeline for domain A 302 may also be input into the NLU pipeline for domain B 304, where the components for domain B 304 will operate on the text as if the text related to domain B, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 3, an NER components 262 and IC module 264 may be considered part of a recognizer (such as recognizer 302, 304, etc.). The recognizers may operate using machine learning trained models such as a CRF, maximum entropy classifier, neural network (such as a deep neural network (DNN) or recurrent neural network (RNN) or other classifier. The recognizers 335 may also use rules that operate on input query text in a particular form to identify named entities and/or intents. The recognizers 335 may also operate using a data structure such as a finite state transducers (FST) to process the query text to perform NER and/or IC. Other techniques or models may also be used to perform NER and/or IC. The techniques may also be used together. For example a set of rules, an FST and a trained machine learning model may all operate on input query text substantially in parallel to determine the named entities/ intents of an input query. If one technique performs its task with high enough confidence, the system may use the output of that technique over the others. The system may also prioritize the results of different techniques in certain circumstances (for example rules results may be higher priority than FST results may be higher priority than model results, or some other configuration). Each recognizer (such as 302, 304, 306 . . . ) may have its own rules, FSTs and/or models operating such that each recognizer operates substantially in parallel to the other recognizers to come up with its own interpretation of the input query text.

The output of each recognizer is a N-best list of intents and identified slots representing the particular recognizer's top choices as to the meaning of the input query text, along with scores for each item in the N-best list. For example, for input query text 300 of "play poker face by lady gaga," the music domain recognizer 302 may output an N-best list in the form of:

[0.95] PlayMusicIntent ArtistName: Lady Gaga SongName: Poker Face

[0.02] PlayMusicIntent ArtistName: Lady Gaga

[0.01] PlayMusicIntent ArtistName: Lady Gaga AlbumName: Poker Face

[0.01] PlayMusicIntent SongName: Pokerface where NER component 262-A of recognizer 302 has determined that for different items in the N-best list the words "poker face" correspond to a slot and the words "lady gaga" correspond to a slot. (Though different items in the N-best list interpret those slots differently, for example labeling "poker face" as a song name in one choice but labeling it as an album name in another.) The IC module 264-A of recognizer 302 has also determined that the intent of the input query is a PlayMusicIntent (and selected that as the intent for each item on the music N-best list). The recognizer 302 also determined a score for each item on the list representing the recognizer's confidence that the particular item is correct. As can be seen in the example, the top item has the highest score. Each recognizer of the built-in recognizers 335 may operate on the input query text substantially in parallel, resulting in a number of different N-best lists, one for each built-in domain (e.g., one N-best list for music, one N-best list for video, etc.). The size of any particular N-best list output from a particular recognizer is configurable and may be different across domains.

While the recognizers 335 perform NER, that is they may identify words of the input query text that are important for downstream processing (sometimes called light slot filling), and may even label those words according to type (such as artist name, album name, city, or the like), the recognizers 335 do not perform entity resolution (i.e., determining the actual entity corresponding to the words of the input query text). Entity resolution is typically a higher latency process and involves communications with a knowledge base 272 or other component to precisely identify the specific entities. As this process is resource intensive, it is preferable to not perform this task for each item of every N-best list across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 340 may be passed to the built-in cross domain processing component 355 which may then further rank the individual items on the N-best list as well as perform other operations.

The built-in cross domain processing component 355 may include a cross-domain ranker 350. The cross-domain ranker 350 takes the group of N-best lists 340 and selects from among the lists the top choices to create a new N-best list that may include items from different domains, but only includes the highest scoring ones of those domains. The purpose of the cross-domain ranker 350 is to create a new list of top scoring potential results, so that downstream (more resource intensive) processes may only operate on the top choices.

As an example of a multi-domain N-best list created by the cross-domain ranker 350, take the example input query text 300 of "play the hunger games." The text may be processed by each of the recognizers 335, and each will output an N-best list, resulting in a group of N-best lists 340 input into the built-in cross domain processing component 355. The cross-domain ranker 350 may then rank the individual items among the N-best lists to create a new N-best list. For example, the cross-domain ranker 350 may output an N-best list in the form of:

[0.78] Video PlayVideoIntent VideoName: The Hunger Games

[0.13] Books ReadBookIntent BookName: The Hunger Games

[0.07] Music PlayMusicIntent AlbumName: Hunger Games where the top items from different N-best lists from multiple domains are grouped into a single N-best list 360. As shown, the top scoring item is from the video domain 304, includes the intent "playvideointent" and a slot labeled as video name corresponding to the text "the hunger games." The next item is from the books domain 306, includes the intent "readbookintent" and a slot labeled as book name corresponding to the text "the hunger games." Each item in the N-best list 360 may also include a score. The size of the cross domain N-best list 360 is configurable.

While the cross-domain ranker 350 takes as input the built-in N-best lists 340, it may also consider other information, such as other data 391. The cross-domain ranker may use a number of different models or techniques such as a maximum entropy classifier, deep neural network, or the like.

The built-in cross domain processing component 355 may also include a light slot filler component 352. This component can take information from slots and alter it to make the data more easily processed by downstream components The operations of the light slot filler component 352 are typically low latency operations that do not involve heavy operations such as reference to a knowledge base. The purpose of the light slot filler component 352 is to replace words with other words or values that may be more easily understood by downstream components. For example, if an input query text included the word "tomorrow" the light slot filler component 352 may replace the word "tomorrow" with an actual date for purposes of downstream processing. Similarly, a word "CD" may be replaced by a word "album." The replaced words are then included in the cross domain N-best list 360.

The N-best list 360 is then output to a heavy slot filler and entity resolution component 370. This component 370 can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The resolver 370 can refer to an authority source (such as a knowledge base 272) that is used to specifically identify the precise entity referred to in the entity mention identified in the incoming text. Specific intent/slot combinations may also be tied to a particular source, which may then be used to resolve the text (such as by providing information or a command to be executed in response to a user query). For example, in the example, "play songs by the stones," the resolver 370 may reference to a personal music catalog, Amazon Music account, or the like. The output from the entity resolution component 370 may include an altered N-best list that is based on the cross-domain N-best list 360 but also includes more detailed information about the specific entities mentioned in the text (such as specific entity IDs) and/or more detailed slot data that can eventually be used by a command processor 290 which, for a built-in domain, may be incorporated into the same system components or pipeline. While illustrated as a cross-domain resolver, multiple resolution components 370 may exist were a particular resolution component 370 may be specific for one or more domains. The slot filling performed by component 370 may include processes that are higher latency, or otherwise require more computing resources than the light slot filling. Thus the system may push to the downstream operations the most resource intensive slot filling, therefore performing such operations on a smaller list of potential results (e.g., the items in N-best lists 362 and 360) rather than on a large list of potential results (e.g., the items in N-best lists 342 and 340).

As noted above, however, it may be desirable to allow the system to take audio data intended for other applications that may not be natively built-in to the system, but rather may be created by another developer and added into the system at a later date. Such supplemental applications add functionality and flexibility to the system, but also add technical challenges. For example, if the system were to incorporate each supplemental application into the pipeline of recognizers 335 and cross domain processing 355, the system may rapidly become overwhelmed by the number of domains and may extend significant computing resources for each input query text when such expenditure may not be necessary.

Presently, to account for executing commands associated with a supplemental application a system may run a set of rules on the query text 300 directly at the outset (i.e., prior to sending the query text to the built-in domain recognizers 335) to determine if the query text 300 corresponds to a supplemental application. The rules may typically be in the form of "ask <application> to <payload>" where the system will recognize the form of the query text, identify the application in the <application> location, and then send the text of the <payload> to an NLU pipeline for the specific application (which may include NER 262, IC 264, entity resolution 370, or other functionality). If a rule is triggered and the system determines that the input query text matches a particular supplemental application, the system may only send the query text 300 for processing by that particular application and may not proceed with processing the query text 300 by the built-in pipeline of recognizers 335 and cross domain operations 355.

This initial rule based check, that cuts off parallel processing of the input query text, may not be desired for several reasons. First, the rule based approach is structured and offers limited flexibility. If the input query text doesn't precisely match the rule, the supplemental application may not be activated. For example, if a rule is configured to recognize "ask uber to get me to boston" it may not recognize "get me a car to boston using uber" or some other query form. Second, the rule based approach may limit expansion of supplemental applications. For example, if one developer names a car service application "float" but another developer names an ice-cream delivery service "float", an input query of "ask float to . . . " may not be processed correctly. Even if rules are more flexible, such as allowing a query in the form of "get me a car to boston," there may be multiple car service applications (such as Uber, Lyft, a taxi service, etc.) and selecting one at the start of processing as a result of a rule check, rather than performing further processing to select between the applications may not give the best result. Further, some applications may have overlapping functionality with built-in domains (for example, a Spotify music player may overlap with Domain A for music). In such situations it may be more desirable to perform further parallel processing across multiple domains, both built-in and supplemental, to determine the appropriate domain and application to handle the query.

Offered is a system configuration that allows parallel processing across multiple built-in and supplemental applications in a manner that does not overwhelm system resources, allows for scalability and expansion of system capabilities through many supplemental applications and results in improved system operation and user satisfaction. The parallel configuration incorporates an early filter to select the top potential supplemental applications, and processes the input-query text substantially in parallel between those top potential supplemental applications as well as the built-in domains and delays selection of a top result until later in the NLU pipeline.

To perform this parallel processing without overwhelming system resources, the system may use a supplemental domain detector 315. The operation of the supplemental domain detector 315 may occur substantially in parallel to the built-in domain recognizers 335. That is, after the system identifies the input query text 300, the system may send that text to both the supplemental domain detector 315 and the built-in domain recognizers 335 to begin their respective processing. So while the supplemental domain detector 315 is determining which applications to activate, the built-in domains may begin their recognizer processing.

The first component of the supplemental domain detector 315 may be the supplemental intent category recognizer 310. This component is configured to identify a top list of intent categories (or individual applications) that may correspond to the query text 300. The supplemental intent category recognizer 310 will identify a short list of best matching supplemental applications or supplemental intent categories that may then be narrowed further to identify which application domains to activate for parallel NLU processing.

Figure 4:
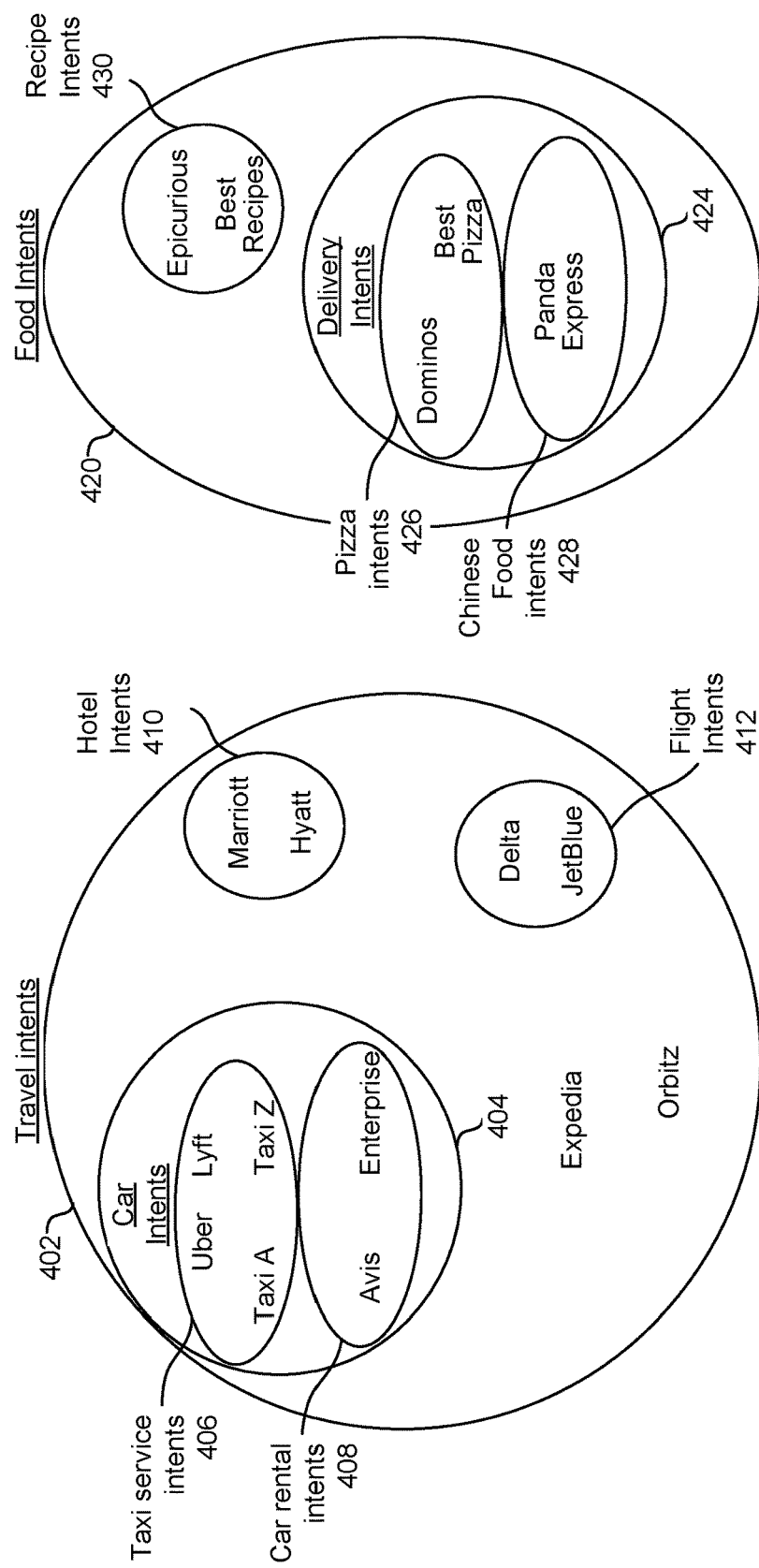
FIG. 4 is a conceptual diagram of organization of applications grouped by intent category according to embodiments of the present disclosure.

To enable many different supplemental applications, the intents capable of being handled by particular supplemental applications may be grouped into intent categories. For example, as shown in FIG. 4, categories may be configured where applications that can handle intents in the particular category are included in the category. A single application may appear in multiple categories. Further, sub-categories may exist within broader categories. As illustrated in FIG. 4 a category of travel intents 402 may include all the supplemental applications available to the system that can perform travel related intents (e.g., rent a car, order a ride, book a plane ticket, book a hotel room, etc.). Within the travel intent category 402 there may be sub categories such as hotel intents 410, flight intents 412 car intents 404, or the like. Further sub-categories may also exist such as taxi service intents 406 and car rental intents 408 within the car intents category 404. Each category may have within it the applications capable of performing an intent within that category. For example, applications Uber, Lyft, Taxi A and Taxi Z are within the taxi service intent category 406 while applications Avis and Enterprise are within the car rental intent category 408. Other applications (for example Expedia and Orbitz) may be generally located in the travel intent category 402 or may also be individually listed in each applicable sub category for which they can handle a given intent (though this is not illustrated in FIG. 4 for readability). Further, other broad categories may exist such as food intents 420 which may have its own sub-categories such as a recipe intent category 430, a delivery intent category 424 (which may have its own sub-categories). Many such categories may be envisioned. Inclusion of a particular application within a category may be done by the developer of an application or by the system based on the intents the particular application is capable of handling.

Grouping applications by capable intents may allow the supplemental intent category recognizer 310 to score input query text 300 by intent category, leaving the selection of a specific application within the category to a downstream component. This is desirable because it allows the supplemental intent category recognizer 310 to be trained to differentiate between categories rather than specific applications. Thus, the supplemental intent category recognizer 310 need not be retrained every time a new application is added within an existing category.

The supplemental intent category recognizer 310 processes the input query text 300 and outputs a supplemental category N-best list 317 which includes a ranking of the particular intent categories and a score for each category on the N-best list. In this manner the supplemental intent category recognizer 310 allows the system to quickly narrow down the universe of potentially relevant supplemental applications. Thus, an item in the N-best list 317 may not necessarily correspond to a particular application (though that is possible as explained below).

The supplemental intent category recognizer 310 may also be capable of performing very high level slot tagging/ NER where the supplemental intent category recognizer 310 may identify that a particular word in the input query text 300 corresponds to a slot, even if the type of the slot may not be known (but may be determined by a downstream component). Thus the supplemental intent category recognizer 310 may determine a score/likelihood that a portion of the query text 300 corresponds to a slot and if that score/likelihood is above a threshold, the portion of query text 300 may be marked as a slot for further NLU processing. Thus, for example, an input query text 300 of "I'd like to go to Boston" may result in an N-best list 317 output by the supplemental intent category recognizer 310 in the form of:

| [0.50] TaxiService Category | Slot: Boston |
| [0.20] Flight Category | Slot: Boston |
| [0.10] CarRental Category | Slot: Boston |
| [0.05] ConcertTickets Category | Slot: Boston |
| [0.02] GeneralTravel Category | Slot: Boston | where each item in the list has a score associated with the recognizer's 310 confidence that the input query text matches that particular category. Alternatively an input query text 300 of "I'd like to listen to Lady Gaga" may result in an N-best list 317 in the form of:

| [0.85] PlayMusic Category | Slot: Lady Gaga |
| [0.05] ConcertTickets Category | Slot: Lady Gaga |

This high level sorting of intent categories by the supplemental intent category recognizer 310 quickly removes from consideration many different (and not relevant) supplemental applications while still allowing for some parallel processing among different supplemental applications as discussed below.

The supplemental intent category recognizer 310 may use a combination of techniques to perform its classification, such as a combination of rules, FSTs, trained machine learning models, or the like. As with the recognizers 335, these techniques and logical operations may run substantially in parallel allowing the supplemental intent category recognizer 310 to determine different scores associated with different results that may be included in the N-best list.

For example, while the supplemental intent category recognizer 310 may be configured to identify scores for particular intent categories (for example using a machine learning model) the supplemental intent category recognizer 310 may also be capable of identifying a particular application using a different logical technique, such as a rule (for example a rule that identifies if a particular application's name is included in the input query text 300). Thus, the supplemental intent category recognizer 310 may also be capable of considering the input query text 300 for a particular application and an intent category at the same time. For example, if the input query text 300 was "I'd like go to Boston using Lyft," the supplemental intent category recognizer 310 may output an N-best list in the form of:

| [0.80] Lyft Application | Slot: Boston |
| [0.10] TaxiService Category | Slot: Boston |
| [0.02] CarRental Category | Slot: Boston |

This type of application identifying capability may be possible using different the different model(s), rules, FSTs, or the like. It also allows the supplemental intent category recognizer 310 to recognize when a specific supplemental application is mentioned but does not then cutoff any consideration of other potential supplemental applications. This is preferred as it may be desirable to consider other supplemental applications over the one specifically mentioned in the input query text under certain circumstances, for example if a specifically mentioned supplemental application is performing poorly. Such factors (which may be considered in other data 391) may be considered by a cross-domain ranker 350 or final ranker 390.

While the primary input to the supplemental intent category recognizer 310 is the input query text 300, it may also consider some additional data 391 such as personalized gazetteers or user preferences/context or other information from a user account 504, or other information. Such additional data 391 may also include dialog context (for example, information about previous queries from device 110 handled by the system), application context (such as other applications operating for the device 110) or other contextual information.

The supplemental intent category recognizer 310 may operate using machine learning trained models such as a CRF, maximum entropy classifier, neural network (such as a deep neural network (DNN) or recurrent neural network (RNN), long short-term memory (LSTM) model or other classifier. A model for the supplemental intent category recognizer 310 may be trained using many different examples of input query text where each example is labeled with the intent category to which the example belongs. Further, training examples may include specific applications as ground truth labels, allowing the model for the supplemental intent category recognizer 310 to handle such inputs as well. The input training examples may also include labeled slots, thus allowing the model for the supplemental intent category recognizer 310 to learn the high level slot tagging as well.

The supplemental intent category recognizer 310 may be configured as a single stage operation or a multi-stage operation. For example, the supplemental intent category recognizer 310 may be configured with a first stage that converts input query text 300 and other input data (such as that from other data 391) into a multi-dimensional vector representation. That is, the system may create a high dimensional embedding vector representing features based on the input query text 300 and other input data 391. The first stage may be a recurrent neural network or other machine learning model such as those discussed herein. A second stage of the supplemental intent category recognizer 310 may be configured to classify the high dimensional vector into a particular intent category or associate the vector with a particular application, to produce the supplemental category N-best list 317. The second stage may involve a classifier or other machine learning model such as those discussed herein. One advantage to the multi-stage approach is that retraining needed to allow for recognition of new intent categories may be easier with the multi-stage approach.

The high level slot tagging by the supplemental intent category recognizer 310 may be very high level, such as simply identifying a word in the input query text 300 as being a word/slot that may be used in downstream NLU processing/command execution. Alternatively, the supplemental intent category recognizer 310 may be configured to add some detail to the slots, such as labeling them as person names, place names, time data, or the like. Though the labeling by the supplemental intent category recognizer 310 is not intended to replace the downstream NER that will be handled on a domain-specific basis. Thus, the slot tagging performed by the supplemental intent category recognizer 310 may be overwritten downstream.

The N-best list 317 output by the supplemental intent category recognizer 310 may then be passed to the supplemental application-domain selector 320. This component takes the N-best list 317 and identifies a short list of supplemental applications that correspond to the intent categories in the N-best list 317. The supplemental application-domain selector 320 may also include in that list any applications that are mentioned specifically in the N-best list 317. The supplemental application-domain selector 320 may use a combination of different model(s), rules, FSTs, or the like. For example, the supplemental application-domain selector 320 may operate using machine learning trained models such as a CRF, maximum entropy classifier, neural network (such as a deep neural network (DNN) or recurrent neural network (RNN) or other classifier.

The supplemental application-domain selector 320 determines a certain number of highest scoring applications that can handle the intents of the intent categories included in the N-best list 317. Thus, a particular intent category in the N-best list may be associated with one or more intents. The supplemental application-domain selector 320 may then identify one or more supplemental applications capable of handling those intents and may provide a score for each of those applications. Each application score may be based on the respective intent category score that was included in the N-best list 317. The supplemental application-domain selector 320 may be configured to select only a certain number of top scoring supplemental applications, to avoid expending too many system resources in downstream processing. In doing so, the supplemental application-domain selector 320 may determine that a particular application score is above (or below) a threshold and/or may determine that a particular intent category score is above (or below) a threshold. Thus the supplemental application-domain selector 320 may output a list of supplemental applications/domains that should handle the input query text 300. The number of supplemental applications/domains may depend on the amount of computing resources the system may dedicate to parallel processing by the different selected supplemental domain.

For each supplemental application selected by the supplemental application-domain selector 320, the system may activate an NLU pipeline, which may include a recognizer and cross domain processor for the supplemental application. For example, if three supplemental applications are selected, the system may activate three NLU domains, one for each of the three selected supplemental applications. The system (either from the supplemental domain detector 315 or other component) may then send the query text 300 to each of those domains corresponding to the selected supplemental applications for further NLU processing. The system may also output some information determined by the supplemental domain detector 315 to the supplemental domain recognizers 337 such as a preliminary identification of slots, scores for the intent categories, or other information.

Take, for example, a situation where the supplemental application-domain selector 320 determines that three supplemental applications (Uber, Lyft and Taxi Z) should handle an incoming query. The system would then send the query text 300 to the individual recognizers for each of the application domains, 303, 305 and 307 (shown in supplemental domain recognizers 337). Each individual recognizer of the supplemental domain recognizers 337 would perform NER and IC and would output an N-best list. The particular recognizers in supplemental domain recognizers 337 may each operate using a combination of rules, FSTs and/or models, similarly to the built-in recognizers 335, only the supplemental domain recognizers 337 are configured to operate according to their own domains. For example, each supplemental domain may have its own NER module, intent classifier and/or other logical components to perform NLU processing. The supplemental domain recognizers 337 would output the supplemental N-best lists 342, which are the accumulated N-best lists of each individual recognizer corresponding to a selected application. Thus, the logical operation of the supplemental domain recognizers 337 is akin to the logical operation of the built-in recognizers 335, even though the built-in recognizers 335 may begin their processing of the query text 300 while the supplemental domain detector 315 is sorting intent categories and selecting supplemental applications for activation.

Each N-best list is configured for the particular application associated with its respective domain. Thus the same query text data may be processed differently depending on the particular domain of the recognizer 337. For example, while an Uber domain 303 may process a portion of text using the NER 262-X and may recognize the portion of text as a location name, the NER 262-X may tag the location name as a potential destination location for the Uber application. Whereas an NER component of a car rental domain may recognize the same portion of text and tag that portion of text as a potential car rental location (or drop off location). Further, an NER component of an air travel domain may recognize the same portion of text and tag that portion of text as a potential flight departure location (or destination location). Thus, the individual N-best list entries may include different domain-specific indicators for query text.

As can be appreciated, the operation of the supplemental domain detector 315 and supplemental domain recognizers 337 allows multiple supplemental domains to process input query text 300 substantially simultaneously without overwhelming available computing resources, which is an improvement over existing systems.

The supplemental cross domain processing component 357 will then perform ranking among the items in the supplemental N-best lists 342 as well as light slot filling, similar to the built-in cross domain processing 355. Indeed the cross-domain ranker 350 and light slot filler 352 of the supplemental cross domain processing component 357 may operate similarly to the matching components of the built-in cross domain processing 355. (Alternatively, the components of the supplemental cross domain processing component 357 may be trained and operate differently from those in the built-in cross domain processing 355.)

The output from the supplemental cross domain processing component 357 may then include a supplemental N-best list 362 which includes the highest scoring intent-slot-score results of relating to the selected supplemental applications. This N-best list 362 may be input, along with the built-in cross domain N-best list 360, into the heavy slot filler and entity resolver 370 which will perform entity resolution and heavy slot filling for all the items on the two N-best lists 360 and 370.

As can be appreciated, the entity resolver 370 may not necessarily be successful in resolving every entity and filling every slot. This may result in incomplete results in the combined N-best list. The final ranker 390 may consider such errors when determining how to rank the ultimate results for potential execution. For example, if an item one of the N-best lists comes from a book domain and includes a read book intent, but the entity resolver 370 cannot find a book with a title matching the input query text, that particular result may be re-scored by the final ranker 390 to be given a lower score. Each item considered by the final ranker 390 may also be assigned a particular confidence, where the confidence may be determined by a recognizer (337 or 335), cross domain processor (357 or 355) or by the final ranker 390 itself. Those confidence scores may be used to determine how to rank the individual NLU results represented in the N-best lists. The confidence scores may be affected by unfilled slots. For example, if one domain is capable of filling a slot (i.e., resolving the word in the slot to an entity or other recognizable form) for an input query the results from that domain may have a higher confidence than those from a different domain that is not capable of filling a slot.

The final ranker 390 may be configured to apply rescoring, biasing, or other techniques to obtain the most preferred ultimate result. To do so, the final ranker 390 may consider not only the NLU results of the N-best lists, but may also consider other data 391. This other data 391 may include a variety of information. For example, the other data 391 may also include application rating or popularity. For example, if one application has a particularly high rating, the system may increase the score of results associated with that particular application. The other data 391 may also include information about applications have been specifically enabled by the user (as indicated in a user profile 504, discussed below in reference to FIG. 5). NLU results from enabled applications may be scored higher than results from non-enabled applications. User history may also be considered, such as if the user regularly uses a particular supplemental application or does so at particular times of day. Date, time, location, weather, type of device 110, customer ID, context and other information may also be considered. For example, the system may consider when any particular applications are currently active (such as music being played, a game being played, etc.) between the system and device 110. As an example of considering location information, for a query such as "get me a Boston car" the re-scorer and final ranker 390 may consider a location of a device 110 corresponding to the origination of the query and may determine a distance from that location to Boston. If the distance is above a threshold (or, for example, if the other data 391 includes travel information regarding an upcoming flight to Boston), the ranker 390 may more highly rate a car rental application whereas if the location of the device 110 is within a threshold distance to Boston the ranker 390 may more highly rate a taxi service application.

The highest scoring result may be passed to a downstream command processor 290 for execution. If the highest scoring result belongs to a supplemental application, the downstream command processor 290 may be located separately from the system, for example command processor 290-X shown in FIG. 1. The final ranker 390 may be configured to output a top list of answers for further disambiguation/selection to determine which potential answer should be further processed/executed. Thus, the downstream command processor 290 may also be capable of outputting data to the user related to the top scoring result prior to execution. For example, if the input query text includes "get me an Uber to Boston" but the user account associated with the device 110 that sent the original query does not have the Uber application enabled, the system may output to the device 110 "do you want to enable Uber and order you a car?" Or the system may prompt the user to disambiguate and select a particular application. For example, if the input query text includes "get me a car to Boston" the system may output to the device 110 "you have enabled both Uber and Lyft. Which would you like to use to order a car to Boston?" Such interactions may also take place as part of a single session between the server 120 and the device 110, allowing the system to hold final execution of NLU results until the user activates an application, or selects which application should be used to process the query.

Various machine learning techniques may be used to perform the training of the supplemental intent category recognizer 310, supplemental application domain selector 320, recognizer components (within 337 or 335), cross-domain ranker 350, entity resolver 370, final ranker 390, or other components. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

Figure 5:
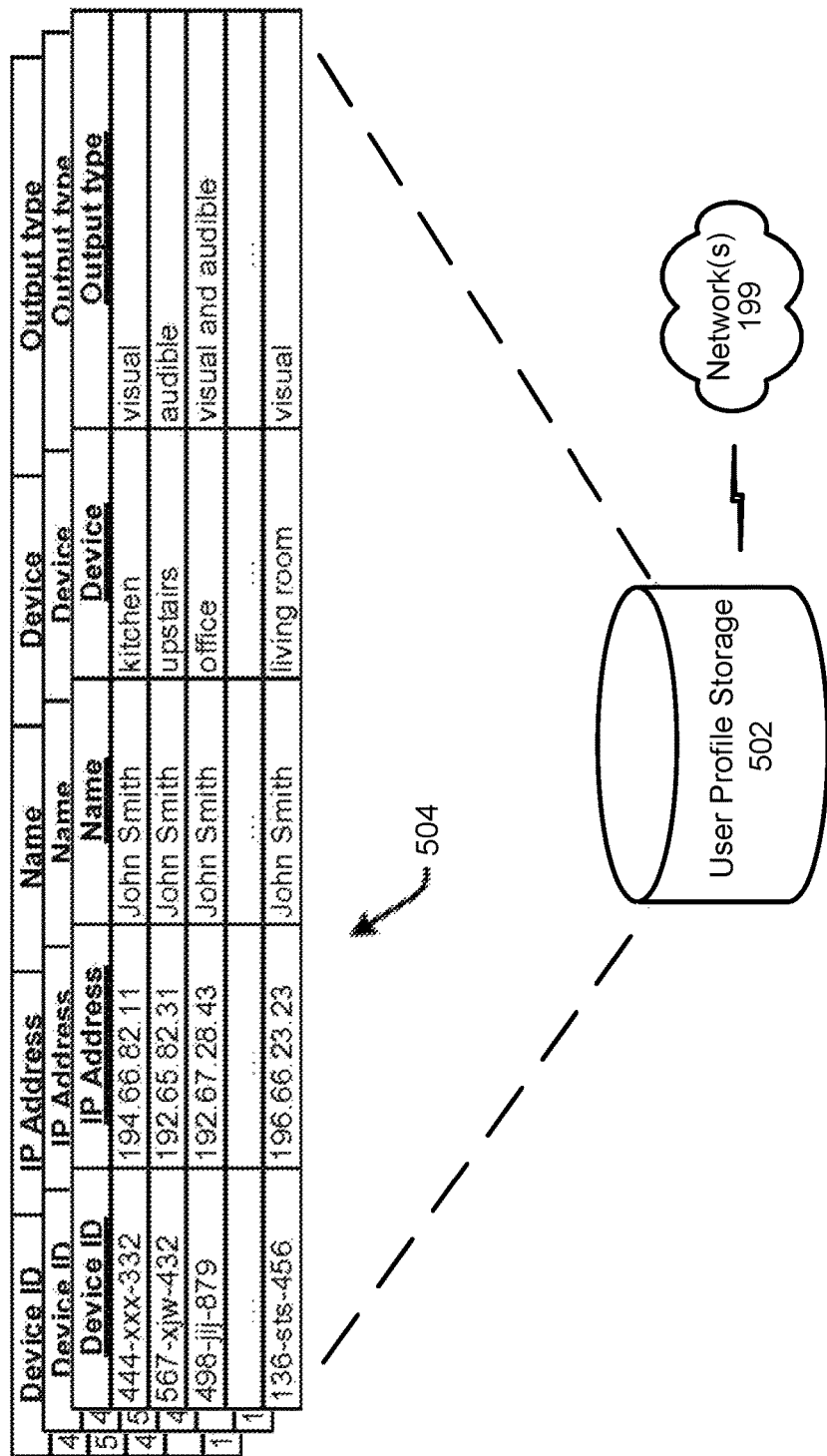
FIG. 5 illustrates data stored and associated with user profiles according to embodiments of the present disclosure.

FIG. 5 illustrates a user profile storage 502 that includes data regarding user accounts 504 as described herein. The user profile storage 502 may be located proximate to the server 120, or may otherwise be in communication with various components, for example over the network 199. The user profile storage 502 may include a variety of information related to individual users, accounts, etc. that interact with the system 100. For illustration, as shown in FIG. 5, the user profile storage 502 may include data regarding the devices associated with particular individual user accounts 504. For example, the user accounts 504 may include particular words that are pronounced a certain way by certain users. The TTS module/component described herein may access the user accounts 504 to determine how words within text are pronounced by certain user and may use that information when performing TTS processing related to the particular user/user account. In an example, the user profile storage 502 is a cloud-based storage. Such data may include device identifier (ID) and internet protocol (IP) address information for different devices as well as names by which the devices may be referred to by a user. Further qualifiers describing the devices may also be listed along with a description of the type of object of the device.

Further, a user account 504 may include information regarding what applications have been enabled for use by a user and/or device. For example, a user may have activated multiple different applications for a particular intent (e.g., Uber and Lyft for a car service intent). The system may use data in the user account 504 when determining what application categories to recognize (for example by supplemental domain category recognizer 310), what application-domains to select (for example by supplemental application domain selector 320) or how to rank certain NLU results against each other (for example by cross-domain ranker 350 or cross-domain ranker 390). The user account 504 may also store user utterance history or other information based on user interactions that may be tracked by the system.

Figure 6:
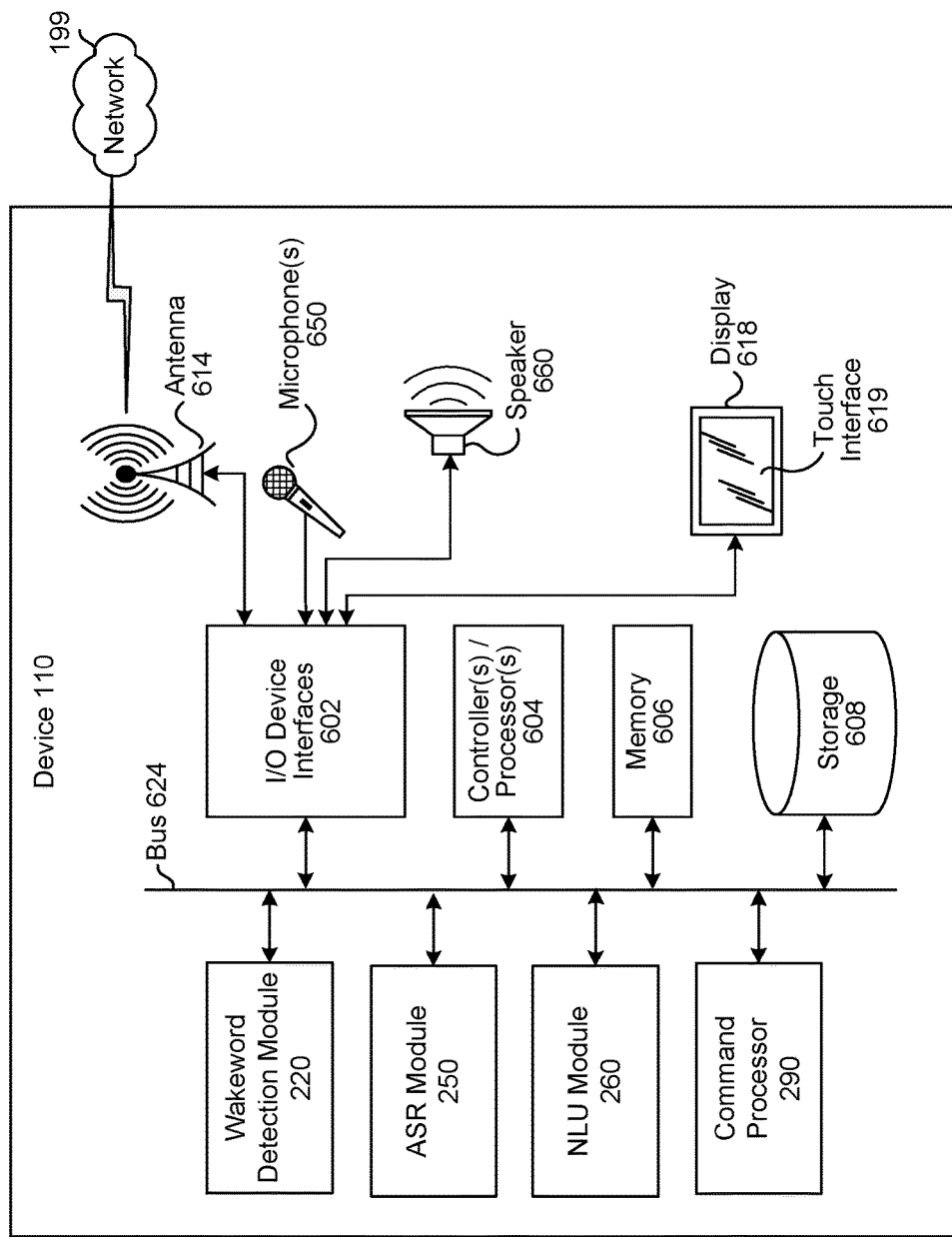
FIG. 6 is a block diagram conceptually illustrating example components of a device according to embodiments of the present disclosure.
Figure 7:
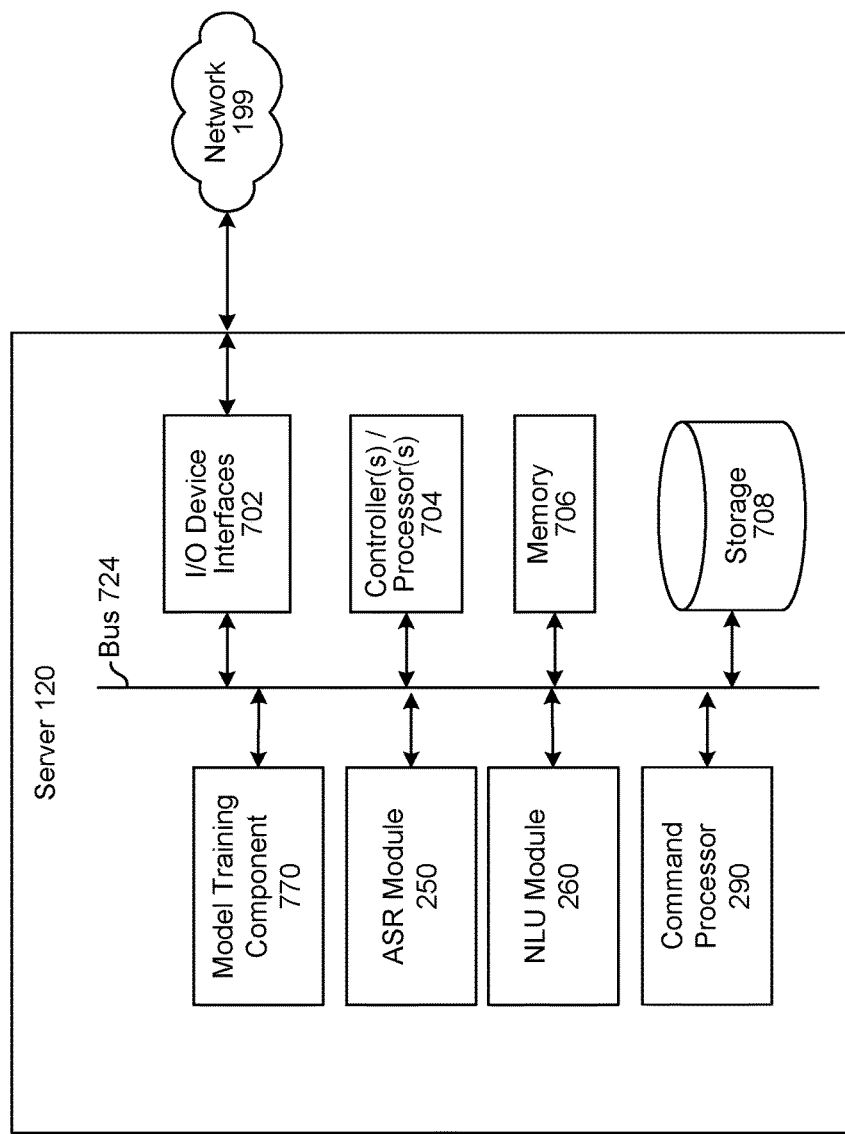
FIG. 7 is a block diagram conceptually illustrating example components of a server according to embodiments of the present disclosure.

FIG. 6 is a block diagram conceptually illustrating a local device 110 that may be used with the described system. FIG. 7 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (604/704), that may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive (MRAM) and/or other types of memory. Each device may also include a data storage component (608/708), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (602/702).

Computer instructions for operating each device (110/120) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120) includes input/output device interfaces (602/702). A variety of components may be connected through the input/output device interfaces, as will be discussed further below. Additionally, each device (110/120) may include an address/data bus (624/724) for conveying data among components of the respective device. Each component within a device (110/120) may also be directly connected to other components in addition to (or instead of) being connected to other components across the bus (624/724).

Referring to the device 110 of FIG. 6, the device 110 may include a display 618, which may comprise a touch interface 619. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 602 that connect to a variety of components such as an audio output component such as a speaker 660, a wired headset or a wireless headset (not illustrated) or other component capable of outputting audio. The device 110 may also include an audio capture component. The audio capture component may be, for example, a microphone 650 or array of microphones, a wired headset or a wireless headset (not illustrated), etc. The microphone 650 may be configured to capture audio. If an array of microphones is included, approximate distance to a sound's point of origin may be performed acoustic localization based on time and amplitude differences between sounds captured by different microphones of the array. The device 110 (using microphone 650, wakeword detection module 220, ASR module 250, etc.) may be configured to determine audio data corresponding to detected audio data. The device 110 (using input/output device interfaces 602, antenna 614, etc.) may also be configured to transmit the audio data to server 120 for further processing or to process the data using internal components such as a wakeword detection module 220.

For example, via the antenna(s), the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge base and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio to determine whether the audio corresponds to particular keywords recognizable by the device 110 and/or system 100. The storage 608 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 608 and compare the captured audio to the stored models and audio sequences using audio comparison, pattern recognition, keyword spotting, audio signature, and/or other audio processing techniques.

The server may include a model training component 770. The model training component may be used to train the classifier(s)/models discussed above.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 6 and 7, are exemplary, and may be located a stand-alone device or may be included, in whole or in part, as a component of a larger device or system.

Figure 8:
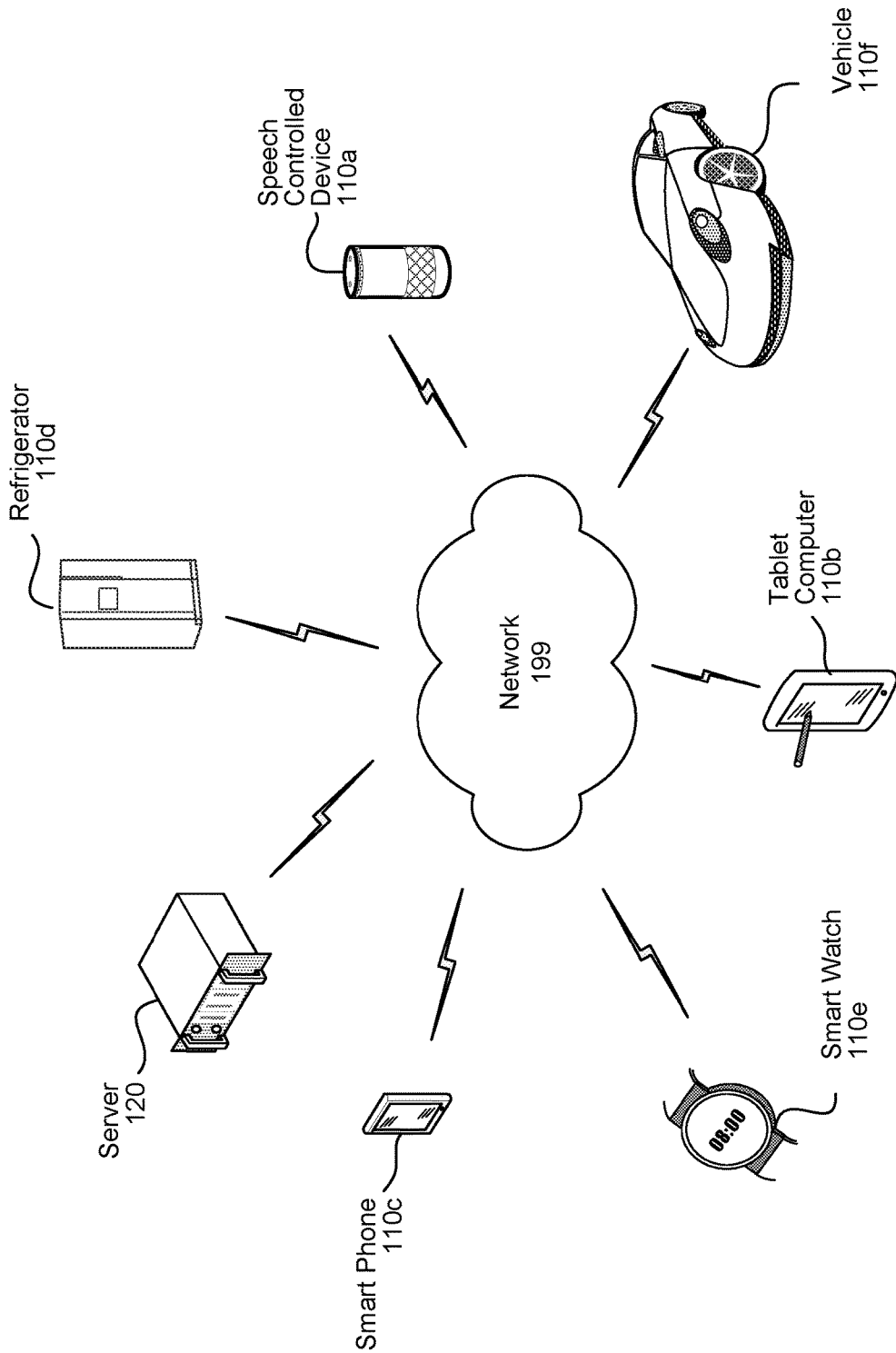
FIG. 8 illustrates an example of a computer network for use with the system.

As illustrated in FIG. 8 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 650 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving text corresponding to a query;
processing the text with a first natural-language understanding (NLU) component to determine a first NLU result;
at least partially in parallel with processing the text with the first NLU component, processing the text with a first trained model to determine:
a first intent category score corresponding to a first likelihood that the text is associated with a first intent category, and
a second intent category score corresponding to a second likelihood that the text is associated with a second intent category;
processing the first intent category score and the second intent category score with a second trained model to select:

a first NLU domain associated with the first intent category, and
a second NLU domain associated with the second intent category; and
after processing the first intent category score and the second intent category score with the second trained model:
processing the text with a second NLU component associated with the first NLU domain to determine a second NLU result,
processing the text with a third NLU component associated with the second NLU domain to determine a third NLU result,
processing the first NLU result, the second NLU result, and the third NLU result to select the second NLU result, and
causing a first command associated with the second NLU result to be executed.

2. The computer-implemented method of claim 1, further comprising:
processing the text with a first named entity recognizer associated with the second NLU component to identify a first portion of the text as corresponding to first data used to execute the first command; and
processing the text with a second named entity recognizer associated with the third NLU component to identify the first portion of the text as corresponding to second data used to execute a second command associated with the third NLU component.

3. The computer-implemented method of claim 2, further comprising:
determining the first portion of text corresponds to first data in a knowledge base, the first data corresponding to a first entity identifier;
determining the first portion of text corresponds to second data in the knowledge base, the second data corresponding to a second entity identifier;
processing the second NLU result and the first entity identifier with a rescoring component to determine a first result score; and
processing the third NLU result and the second entity identifier with the rescoring component to determine a second result score,
wherein determining that the text most closely corresponds to the second NLU result comprises determining the first result score is higher than the second result score.

4. The computer-implemented method of claim 2, further comprising:
processing a representation of the text to determine a likelihood that the first portion of the text corresponds to a word used for further command processing;
determining that the likelihood that the first portion of the text corresponds to the word is above a second threshold; and
creating an indication corresponding to the first portion, wherein processing the text with the first named entity recognizer further comprises processing the indication with the first named entity recognizer to identify the first portion of the text as corresponding to data used to execute the first command.

5. The computer-implemented method of claim 2, wherein causing the first command to be executed comprises one of:
sending, to a device associated with the second NLU component, the first portion of text and an instruction to initiate an action using the first portion of text.

6. The computer-implemented method of claim 1, wherein a third NLU domain associated with the first intent category is not within the first intent category or within the second intent category.

7. A system comprising:
at least one processor; and
a memory including instructions that, when executed by the at least one processor, cause the system to:
receive text corresponding to a query;
process the text with a first natural-language understanding (NLU) component to determine a first NLU result;
at least partially in parallel with processing the text with the first NLU component, process the text with a first trained model to determine:
a first intent category score corresponding to a first likelihood that the text is associated with a first intent category, and
a second intent category score corresponding to a second likelihood that the text is associated with a second intent category;
process the first intent category score and the second intent category score with a second trained model to select:
a first NLU domain associated with the first intent category, and
a second NLU domain associated with the second intent category; and
after processing the first intent category score and the second intent category score with the second trained model:
process the text with a second NLU component associated with the first NLU domain to determine a second NLU result,
process the text with a third NLU component associated with the second NLU domain to determine a third NLU result,
process the first NLU result, the second NLU result, and the third NLU result to select the second NLU result, and
cause a first command associated with the second NLU result to be executed.

8. The system of claim 7, wherein the memory further comprises instructions that, when executed by the at least one processor, further cause the system to:
process the text with a first named entity recognizer associated with the second NLU component to identify a first portion of the text as corresponding to first data used to execute the first command; and
process the text with a second named entity recognizer associated with the third NLU component to identify the first portion of the text as corresponding to second data used to execute a second command associated with the third NLU component.

9. The system of claim 8, wherein the memory further comprises instructions that, when executed by the at least one processor, further cause the system to:
determine the first portion of text corresponds to first data in a knowledge base, the first data corresponding to a first entity identifier;
determine the first portion of text corresponds to second data in a knowledge base, the second data corresponding to a second entity identifier;
process the second NLU result and the first entity identifier with a rescoring component to determine a first result score; and process the third NLU result and the second entity identifier with the rescoring component to determine a second result score,
wherein the instructions that configure the at least one processor to determine that the text most closely corresponds to the second NLU result comprise instructions that configure the at least one processor to determine that the first result score is higher than the second result score.

10. The system of claim 8, wherein the memory further comprises instructions that, when executed by the at least one processor, further cause the system to:
process a representation of the text to determine a likelihood that the first portion of the text corresponds to a word used for further command processing;
determine that the likelihood that the first portion of the text corresponds to the word is above a second threshold; and
create an indication corresponding to the first portion,
wherein the instructions that, when executed by the at least one processor, further cause the system to process the text with the first named entity recognizer further configure the at least one processor to process the indication with the first named entity recognizer to identify the first portion of the text as corresponding to data used to execute the first command.

11. The system of claim 8, wherein the instructions that configure the at least one processor to cause the first command to be executed further comprise instructions that, when executed by the at least one processor, further cause the system to:
send, to a device associated with the second NLU component, the first portion of text and an instruction to initiate an action using the first portion of text.

12. The system of claim 7, wherein a third NLU domain associated with the first intent category is not within the first intent category or within the second intent category.

13. The system of claim 7, wherein the instructions to process the text with the first trained model include instructions that, when executed by the at least one processor, further cause the system to:
determine, using a recurrent neural network, a multidimensional vector representing at least one feature of the text; and
determine, using a classifier and the multi-dimensional vector, an application associated with the text.

14. The system of claim 7, wherein the instructions to select the second NLU domain include instructions that, when executed by the at least one processor, further cause the system to:
determine that the second intent category score is above a threshold.

15. The system of claim 7, wherein the first trained model includes at least one of a recurrent neural network (RNN), a deep neural network (DNN), or a long short-term memory (LSTM) model.

16. The system of claim 7, wherein the second NLU component comprises one of a named-entity recognition component or an intent classification component.

17. The system of claim 16, wherein the second NLU component comprises the named-entity recognition component that includes a conditional-random field model and wherein the instructions that cause the system to process the text with the second NLU component comprise instructions that, when executed by the at least one processor, cause the system to:
process, using the conditional-random field model, the text to determine a first score representing a likelihood that an entity is represented in the text,
wherein the second NLU result includes the first score.

18. The system of claim 16, wherein the second NLU component comprises the intent classification component that includes a classifier and wherein the instructions that cause the system to process the text with the second NLU component comprise instructions that, when executed by the at least one processor, cause the system to:
process, using the classifier, the text to determine a first score representing a likelihood that the text corresponds to an intent,
wherein the second NLU result includes the first score.

19. The system of claim 7, wherein the instructions that cause the system to process the first NLU result, the second NLU result, and the third NLU result to select the second NLU result comprise instructions that, when executed by the at least one processor, cause the system to:
determine a first number of recognized entities in the first NLU result;
determine a second number of recognized entities in the second NLU result;
determine a third number of recognized entities in the third NLU result; and
determine that the second number is greater than the first number and the third number.

20. The system of claim 7, wherein:
the first NLU component is one of a first plurality of NLU components, wherein the first plurality of NLU components are configured to process input text data at least partially in parallel to operation of the first trained model; and
the first NLU domain and the second NLU domain are included in a plurality of domains, each of which is associated with at least one respective NLU component, the respective NLU components being configured to be operated only after a respective domain is selected using the second trained model.

21. The system of claim 7, wherein the instructions that cause the system to select the second NLU domain comprise instructions that, when executed by the at least one processor, cause the system to:
determine an application score corresponding to a third likelihood that an application is associated with the second intent category;
determine that the application score is greater than a first threshold; and
determine that the second intent category score is greater than a second threshold.

* * * * *